US009823402B2

(12) United States Patent
Hao et al.

(10) Patent No.: US 9,823,402 B2
(45) Date of Patent: Nov. 21, 2017

(54) ILLUMINATION ARTICLES

(71) Applicant: 3M INNOVATIVE PROPERTIES COMPANY, St. Paul, MN (US)

(72) Inventors: Bing Hao, Woodbury, MN (US); David A. Ender, New Richmond, WI (US); Michael E. Griffin, Maplewood, MN (US); Kevin W. Anderson, St. Paul, MN (US); Gina M. Buccellato, Eagan, MN (US); Barry S. Carpenter, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 123 days.

(21) Appl. No.: 14/436,559

(22) PCT Filed: Oct. 16, 2013

(86) PCT No.: PCT/US2013/065220
§ 371 (c)(1),
(2) Date: Apr. 17, 2015

(87) PCT Pub. No.: WO2014/062789
PCT Pub. Date: Apr. 24, 2014

(65) Prior Publication Data
US 2016/0170119 A1 Jun. 16, 2016

Related U.S. Application Data

(60) Provisional application No. 61/716,088, filed on Oct. 19, 2012.

(51) Int. Cl.
*F21V 8/00* (2006.01)
*A42B 3/04* (2006.01)
(Continued)

(52) U.S. Cl.
CPC .............. *G02B 6/001* (2013.01); *A42B 3/044* (2013.01); *A42B 3/0446* (2013.01);
(Continued)

(58) Field of Classification Search
CPC ...... G02B 6/01; G02B 6/0006; G02B 6/0036; A42B 3/0446; A42B 3/044; G02C 11/04; F21Y 2115/10
See application file for complete search history.

(56) References Cited

U.S. PATENT DOCUMENTS

| 4,002,895 A | 1/1977 | Ketler et al. |
| 5,237,641 A | 8/1993 | Jacobson |

(Continued)

FOREIGN PATENT DOCUMENTS

| DE | 202011106775 | 3/2013 |
| JP | 04053217 U1 | 5/1992 |

(Continued)

OTHER PUBLICATIONS

International Search Report for PCT International Application No. PCT/US2013/065220 dated Jan. 21, 2014, 5 pages.

*Primary Examiner* — David V Bruce
(74) *Attorney, Agent, or Firm* — Yufeng Dong

(57) ABSTRACT

Illumination articles are described. More specifically, illumination articles that include a wearable device configured for wearing on the head of a wearer, a lightguide and light sources for emitting light into the lightguide are described. The illumination articles allow for wearable devices that uniformly illuminate a working area at high brightness without providing excessive glare to observers.

12 Claims, 18 Drawing Sheets

(51) Int. Cl.
*G02C 11/04* (2006.01)
*F21Y 115/10* (2016.01)
(52) U.S. Cl.
CPC ......... *G02B 6/0006* (2013.01); *G02B 6/0036* (2013.01); *G02C 11/04* (2013.01); *F21Y 2115/10* (2016.08)

(56) References Cited

U.S. PATENT DOCUMENTS

| | | | |
|---|---|---|---|
| 6,053,936 A * | 4/2000 | Koyama | A61M 21/00 600/27 |
| 6,637,924 B2 | 10/2003 | Pelka | |
| 7,104,678 B2 | 9/2006 | De Lamberterie | |
| 7,941,013 B2 | 5/2011 | Marttila | |
| 8,267,565 B2 | 9/2012 | Pan | |
| 2003/0058633 A1 | 3/2003 | Suzuki | |
| 2007/0052882 A1 | 3/2007 | Hwang | |
| 2007/0279727 A1 | 12/2007 | Gandhi | |
| 2009/0129098 A1 | 5/2009 | Lin | |
| 2010/0014318 A1 | 1/2010 | Chi | |
| 2010/0177505 A1 | 7/2010 | Ho | |
| 2010/0315833 A1 | 12/2010 | Holman | |
| 2011/0141765 A1 | 6/2011 | Chang | |
| 2011/0149603 A1 | 6/2011 | Tortora | |
| 2012/0170260 A1 | 7/2012 | Gardner | |

FOREIGN PATENT DOCUMENTS

| | | |
|---|---|---|
| JP | H9-213101 | 8/1997 |
| JP | H10-133026 A | 5/1998 |
| JP | 2002-350790 | 12/2002 |
| JP | 3161024 U | 7/2010 |
| WO | WO 2007-149170 | 12/2007 |
| WO | WO 2008-156236 | 12/2008 |
| WO | WO 2009-099547 | 8/2009 |
| WO | WO 2010-124028 | 10/2010 |
| WO | WO 2011-008473 | 1/2011 |

* cited by examiner

ILLUMINATION ARTICLES

BACKGROUND

High brightness light-emitting diodes are finding use in applications requiring high illuminance because of their favorable efficacy and long lifetimes compared to other light sources such as tungsten bulbs. One drawback, however, is the excessive glare encountered by direct or even reflected observation of the light-emitting diode.

SUMMARY

The present disclosure describes illumination articles including a wearable device configured for wearing on the head of a wearer, and a lightguide disposed on the wearable device, wherein the lightguide is elongated and has a first end and a second end opposite the first end. The illumination articles also include a first LED positioned at the first end, for emitting light into the lightguide. The lightguide further includes a light emitting surface extending generally in an x-direction between the first and second ends, and a light reflecting surface positioned opposite to the light emitting surface. The light reflecting surface includes a plurality of light extractors for directing light in a y-direction perpendicular to the x-direction. The light emitting surface is configured for directing light into an x-y plane.

In some embodiments, the illumination articles include a second LED positioned at the second end, for emitting light into the lightguide. In some embodiments, at least some of the light extractors in the plurality of light extractors are configured to convert a plurality of light rays generated by the first light source into a quasi-collimated light beam. In some embodiments, at least some of the light extractors in the plurality of light extractors include an extractor light reflecting surface, wherein the extractor light reflecting surfaces are varied in a systematic way so that light reflected out of the lightguide propagates in a predetermined manner. The extractor light reflecting surface in certain embodiments may be curved, convex or concave. The extractors may also be wedge-shaped. In some cases, the extractors are wedge-shaped with positive cylindrical sag or negative cylindrical sag.

In certain embodiments, a portion of the light emitting surface may have a curved yz-profile. In some embodiments the light emitting surface yz-profile is convex or aspheric. The light emitting surface may include facets. The light emitting surface may also have curved or arched profile in the xz-plane. The illumination article may also include a pivot point at one or both of the opposed ends of the lightguide, such that light may be directed into a plane outside of the xy-plane. The illumination article may further comprise a supplemental back reflector positioned opposite the light reflecting surface from the lightguide. The supplemental back reflector may have a curved-yz profile, and may be convex, concave or aspherical.

The wearable device of the presently described illumination article may be a number of appropriate elements. In one embodiment, the wearable device may be safety spectacles. In such an embodiment the safety spectacles may include first and second side temple pieces extending rearward from first and second attachment points located proximate to the first and second ends of the lightguide, respectively, the first and second attachment points defining a frontal portion of the safety spectacles therebetween, wherein the frontal portion comprises at least one frontal lens portion distinct from the lightguide. In other embodiments, the wearable device may be safety goggles, a face shield, a full face respirator, a head top for a powered respirator, a mining helmet, a medical headset or potentially reading spectacles.

DETAILED DESCRIPTION

The present description relates to a variety of illumination articles. As is commonly understood, a number of applications in various fields or for purposes of leisure require some sort of headgear that may also require a lighting component in order for the user to effectively operate. The move to higher-brightness LEDs has provided the benefits of brightness, efficiency and longer lifetimes, but has also raised issues relating to colleagues of users wearing such LED-lit devices looking directly at the LEDs in a work environment. These colleagues not wearing the illumination articles may complain of bright spots, glare, and discomfort when looking at the wearer of the illumination articles. Additionally, users of such articles may complain of shadows or non-uniform lighting issues. For examples, light shining on a work surface from a point light source may be blocked by a user's hands or working tools, and obscure the view of the work area in darkness. Illumination articles of the present description provide an improvement over more standard approaches of wearable illumination that rely on, for example, LEDs mounted on temple-pieces of spectacles, or LED headlamps. Illumination articles of the present disclosure provide relief from the above-noted problems, by delivering light from the lightguide that is generally easier on the eyes of someone looking toward the light source by virtue of replacing a point source with an elongated one. Additionally, the elongated nature of the lightguide element (i.e., having an extended light emitting area) can greatly reduce annoying shadowing produced by having hands in a work area illuminated by, for example, LEDs aimed directly into the work area.

Figure 1:
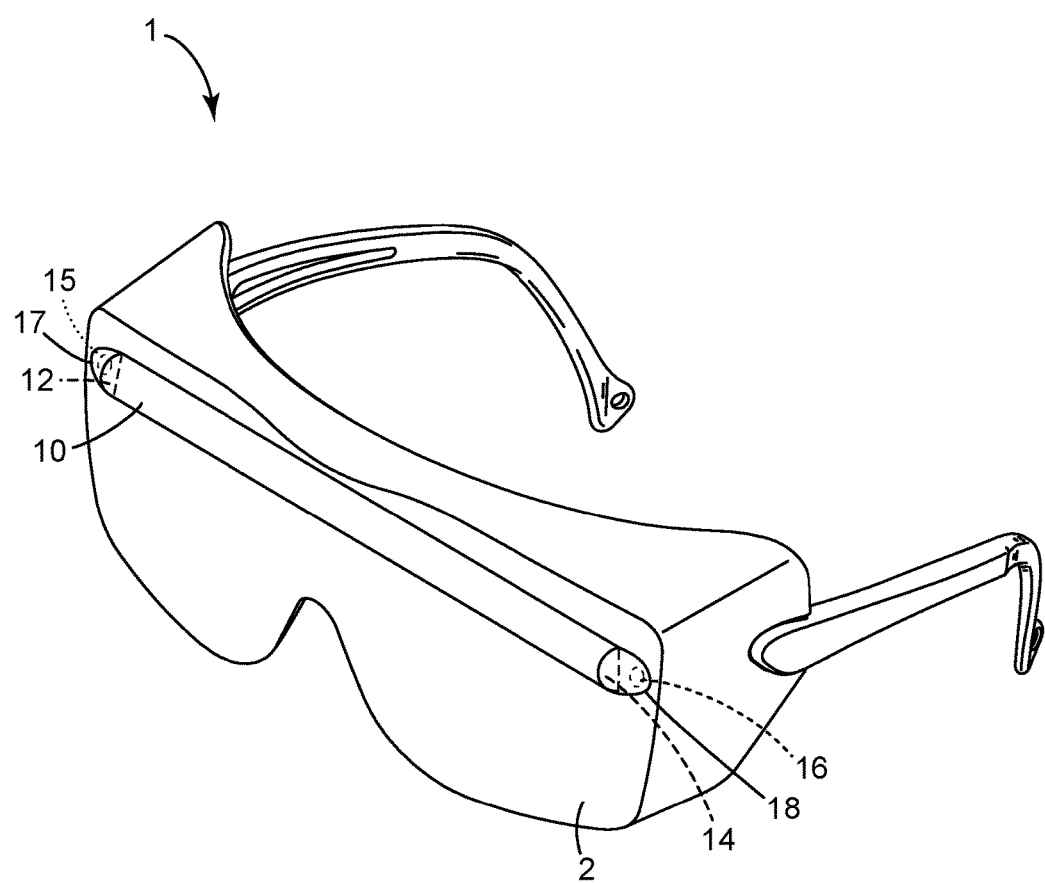
FIG. 1 shows a perspective view of an exemplary embodiment of an illumination article of the present disclosure.

An illumination article of the present disclosure includes a lightguide disposed on a wearable device. In use, the illumination article is typically worn on a wearer's head, and illuminates a region viewed by the wearer. FIG. 1 shows a simplified embodiment of an illumination article 1 that includes safety spectacles 2 as the wearable device, having a lightguide 10 disposed thereon. Lightguide 10 is elongated and has a first end 12 and a second end 14 opposite the first end 12. Light sources 15 and 16 are positioned for emitting light into the opposite ends of the lightguide, and typically light sources 15 and 16 are housed within light source holders 17 and 18, respectively. Light sources 15 and 16 can be connected to a suitable power supply (not shown). Lightguide 10 is configured to direct light from the light sources in a desired direction, typically in front of a person wearing safety spectacles 2, and typically in such a manner that a person viewing the light emitted from lightguide 10 will not experience excessive glare.

Figure 2A:
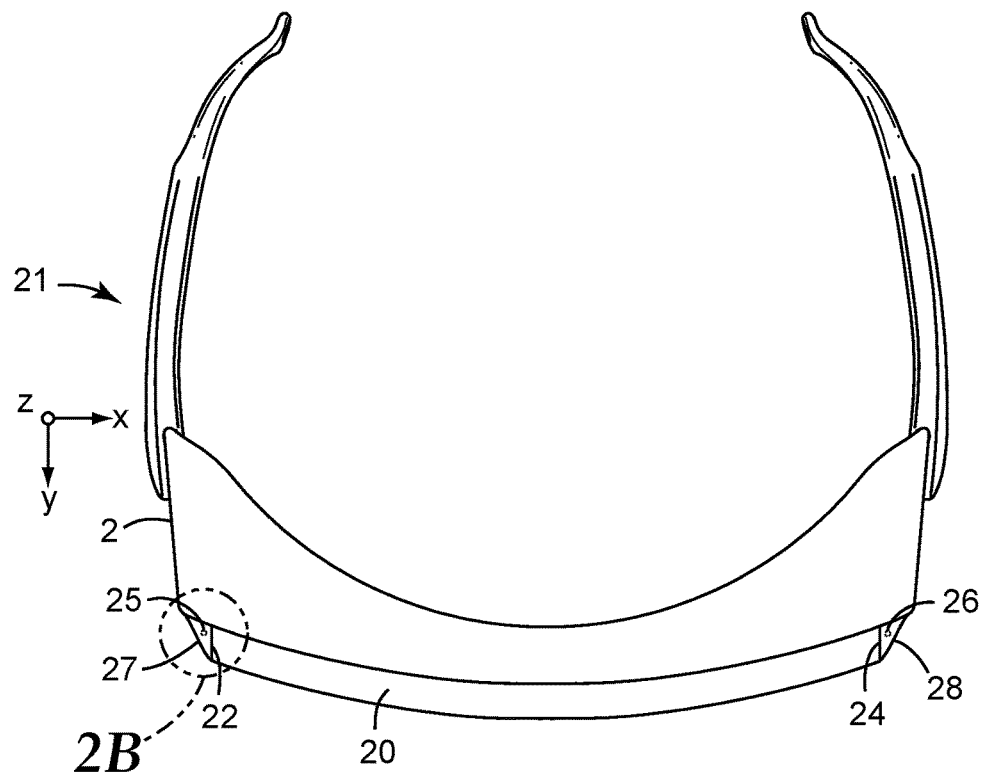
FIG. 2A shows a top view of an exemplary embodiment of an illumination article of the present disclosure.
Figure 2B:
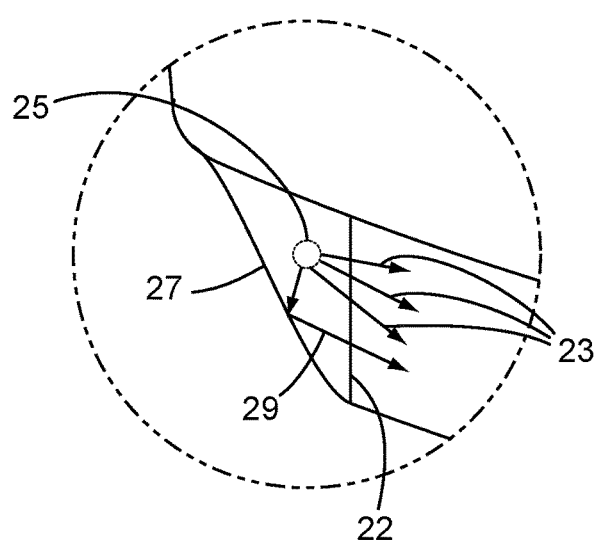
FIG. 2B shows an enlarged region of FIG. 2A.

FIG. 2A shows a top view of a simplified embodiment of an illumination article 21 including safety spectacles 2 and lightguide 20 having first end 22 and second end 24 opposite the first end 22. Light sources holders 27 and 28 are positioned at opposite ends of lightguide 20, holding light sources 25 and 26, respectively. Light sources 25 and 26 may be point light sources, such as LEDs. FIG. 2B shows an enlargement of a portion of FIG. 2A, showing light source 25 within light source holder 27. A plurality of light rays 23 is shown as emitting from light source 25 and entering first end 22 of lightguide 20. Other light rays (e.g., 29) may be reflected from a surface of light source holder 27 before entering first end 22 of lightguide 20. In some embodiments, reflection of light ray 29 can be via total internal reflection ("TIR"), or by providing a reflective coating on the surface of light source holder 27, or by a combination of TIR and reflective coating. In some embodiments, a pre-collimation element (e.g., a lens, not shown) may be included between light source 25 and first end 22 of lightguide 20, in order to pre-collimate light rays emitted from light source 25. However, it has been discovered that a pre-collimation element need not be included for achieving the desired reduction in glare while maintaining brightness. In some embodiments, it may even be desirable to not include a pre-collimation element, for example, for simplification of manufacture. In embodiments not having a pre-collimation element, it may be desirable to include a light introduction area, for example, a notch (not shown) in first end 22.

FIGS. 1, 2A and 2B are simplified representations of illumination articles of the present disclosure, and it should be understood that the lightguide is configured to direct light from a light source (or from more than one light source) to a region in front of a person wearing the illumination article, as described in more detail herein. FIGS. 1, 2A and 2B should also not be considered to limit the present disclosure to safety spectacles as the wearable device. A variety of illumination articles are described herein that generally include devices wearable on the head of a wearer, including, for example, any of safety goggles, a face shield, a full face respirator, a head top for a powered respirator, a mining helmet, medical and dental illuminating headware, or even reading spectacles. These and other examples of wearable devices can have at least one lightguide of the present disclosure disposed thereon to provide illumination articles of the present description.

In typical embodiments, the lightguide is elongated, has LEDs as light sources injecting light directly into opposed ends of the lightguide, and the lightguide directs light from the LEDs in a selected direction, typically forward relative to the wearer. The lightguide can accomplish direction of light by a combination of features including a configuration of light extractors in the lightguide and the shape of the lightguide light emitting surface. The lightguide is typically a solid lightguide. A more detailed understanding of how the lightguide performs the desired function is provided below.

FIGS. 3A to 3D show several views of an exemplary embodiment of a lightguide 10 of the present disclosure, including an xyz-coordinate system to orient the viewing of those figures. For orientations where a view is aligned with one of the axes, an open circle represents a view in a "positive" direction along the axis, and a darkened circle represents a view in a "negative" (i.e., opposite) direction along the axis. As shown in the perspective view in FIG. 3A, lightguide 10 is elongated along the x-direction between first end 12 and second end 14. Lightguide 10 is typically made of a transparent or semi-transparent material. A first light source 15 is positioned at first end 12, for emitting light into lightguide 10. In some embodiments, a second light source 16 (not shown in FIG. 3A) is positioned at second end 14, also for emitting light into lightguide 10. In some embodiments, additional light sources (not shown) can be provided at either or both ends of lightguide 10 for emitting light into the lightguide. In some other embodiments, lightguide 10 may include a reflective surface at second end 14 for reflecting light from first light source 15 back towards first end 12. In still other embodiments, a single LED source could be placed partway, e.g. halfway down the lightguide, and be emitted towards the first end 12 and second end 14 of the lightguide, potentially through use of a deflector that bifurcates the light into the two sections (section nearest first end 12, and section nearest second end 14). Lightguide 10 has a light emitting surface 30 extending along the x-dimension, and a light reflecting surface 35 positioned opposite light emitting surface 30. Light reflecting surface 35 includes a plurality of light extractors 40 for reflection of light from the light source(s) and directing the light out through light emitting surface 30, generating a light cone in the y-direction.

Figure 3A:
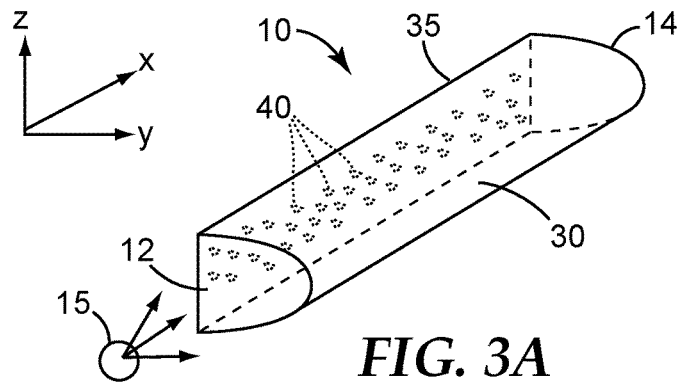
FIGS. 3A-3D show various views of an exemplary embodiment of a lightguide of the present disclosure.
Figure 3B:
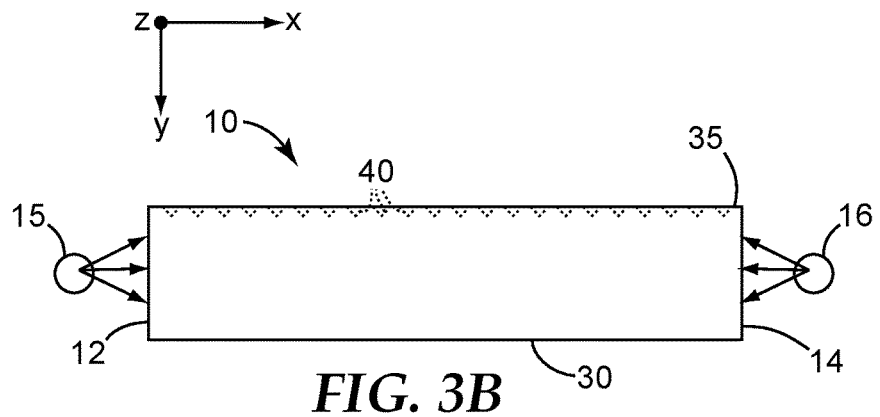

FIG. 3B shows a "top" view of the lightguide, looking down into the z-axis, showing light reflecting surface 35 positioned opposite light emitting surface 30, and having plurality of light extractors 40 disposed on light reflective surface 35.

Figure 3C:
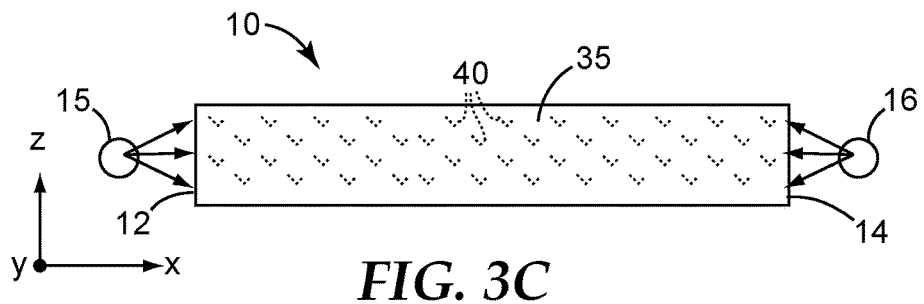

FIG. 3C shows a "front" view of lightguide 10, looking into the lightguide (into the y-axis) and through light emitting surface 30 to see light reflecting surface 35 having plurality of light extractors 40.

Figure 3D:
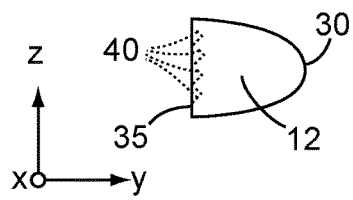

FIG. 3D shows a "side" view of lightguide 10 as viewed along the x-axis from first end 12, showing plurality of light extractors 40 as indentations in light reflecting surface 35.

The exemplary embodiment of lightguide 10 shown in the various views in FIGS. 3A-3D should not be considered to limit the lightguide of the present description. As will be discussed below, a selected configuration of the light emitting surface and a selected configuration of the plurality of light extractors can be combined and each contributes to directing light generally in the direction of the y-axis as it leaves the lightguide.

Figure 4:
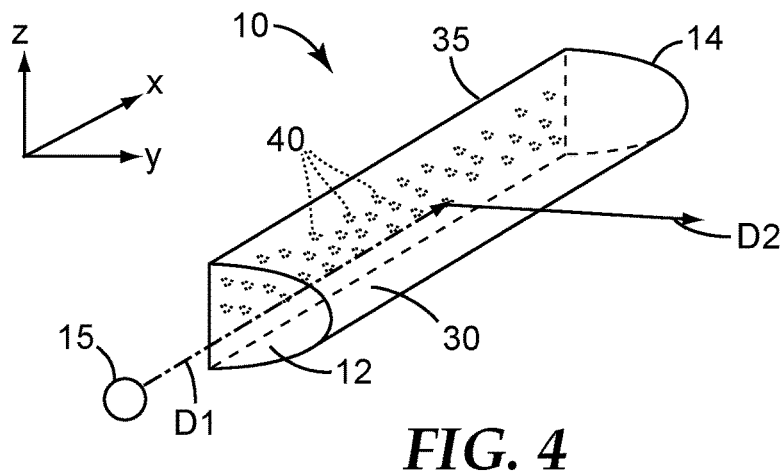
FIG. 4 shows a perspective view of an exemplary embodiment of a lightguide of the present disclosure.
Figure 6:
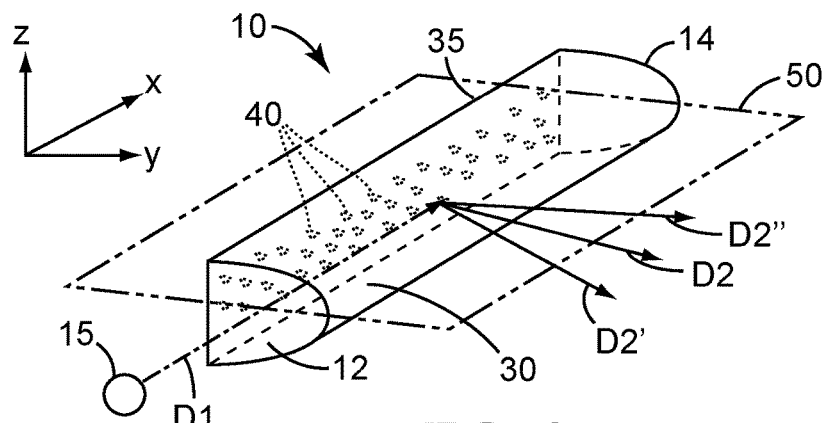
FIG. 6 shows a perspective view of an exemplary embodiment of a lightguide of the present disclosure.

FIG. 4 more clearly illustrates the functionality of a lightguide 10 according to the present description. Light source 15 is positioned at a first end 12 of the lightguide and emits light into the lightguide 10 in a first direction D1. Light emitting surface 30 extends generally in an x-direction between the first end 12 and second end 14. Although not shown, a second light source may be positioned at second end 14 and emit light into the lightguide 10 as well. The lightguide 10 includes a light reflecting surface 35 that is positioned opposite to the light emitting surface 30. The light reflecting surface 35 includes a plurality of light extractors 40 that direct the light injected into the lightguide from light source and incident upon the light reflecting surface in a second direction D2 that corresponds to the y-axis (generally). For purposes of this description, where a direction corresponds to a provided axis of a coordinate system, e.g., the y-axis, it may be referred to as, e.g., "the y-direction." The y-direction is perpendicular to the x-direction along which the emission surface extends (as illustrated by the coordinate system in FIG. 4). Generally, the average direction of the light re-directed from the reflecting surface 35 and emitted from emitting surface, as defined in the xy-plane will be along the y-direction. This concept is illustrated in FIG. 6. However, at least some light will fall on either side of direction D2. For example, as illustrated in FIG. 6, within x-y plane 50 at least some light may be directed along direction D2' and along D2" on the opposite side of D2 from D2'. In either case, directions D2' and D2" will generally be within a given angle of the direction D2 (or within a given angle of the y-direction in the x-y plane). Generally, light will be emitted from surface 30 according to the directionality provided by extractors 40 within a 50-degree, 45-degree, 40-degree, 35-degree, 30-degree, 25-degree, 20-degree, 15-degree, or even within a 10-degree deviation from direction D2 (or the y-direction).

Figure 7A:
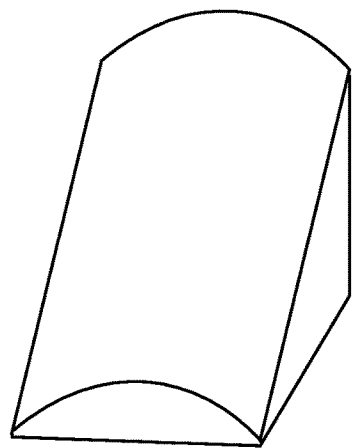
FIGS. 7A-7B show perspective views of exemplary embodiments of extractors of the present disclosure.
Figure 7B:
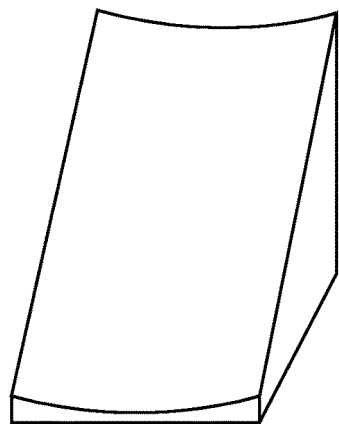

In order to properly direct light along the y-direction, it is necessary to appropriately choose proper extractor shape, orientation, and potentially spacing. A number of different shapes of extractors are contemplated in the present description, for example, the light extractors 40 may be prisms, cones, aspheric cones, truncated prisms, cones, aspheric cones, wedges, hemispheres, conic sections, or truncated conic sections. A further description of these shapes and other appropriate light extractor shapes, as well as potential method of making such shapes may be found in commonly owned U.S. Pat. No. 7,941,013 (Martina et al.), the relevant portions of which are hereby incorporated by reference. In one embodiment, the extraction features may be wedges, as illustrated in FIGS. 7A-B. The wedge shown in FIG. 7A is a wedge having negative cylindrical sag. The wedge shown in FIG. 7B is a wedge having positive cylindrical sag. Both of these shapes are contemplated as appropriate extractor shapes in the present description. As noted, it is also important to properly orient the light extraction features 40 with respect to the incident light from light source 15 (or 16). This is truly important where the extraction features include facets (such as in the case of a wedge or prism).

Extractors shaped as cones represent another favorable embodiment. Variation of the cone half-angle affects the angular distribution of the light in a fashion similar to the wedge extractor. Cone half-angles in the range of 45 degrees to 60 degrees exhibit a substantial collimating effect. The advantage to cones is their axial symmetry, which is useful in complicated light guide geometries in which internal rays assume a variety of angles.

Figure 8A:
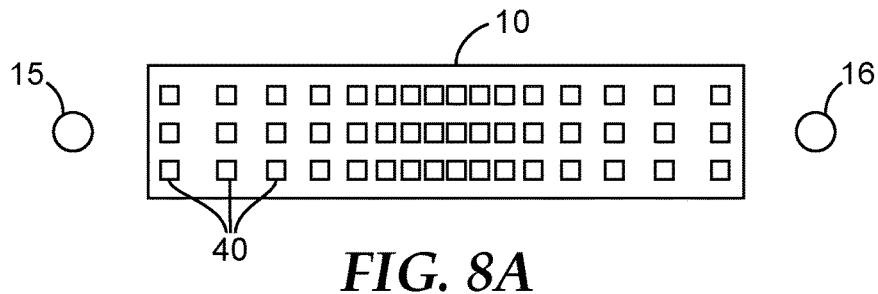
FIGS. 8A-8B show front views of an exemplary embodiment of an illumination article of the present disclosure.
Figure 8B:
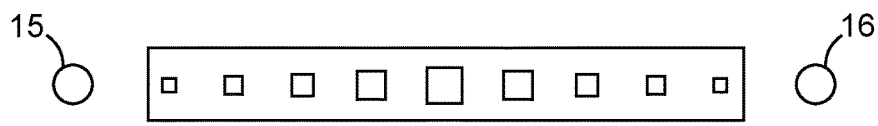

As illustrated in FIG. 8A, in order to ensure that light is uniformly emitted from light emitting surface 30, and users avoid bright spots, it is important ensure that the light extractors are distributed and oriented such that light is reflected off of the reflective surface 35 in a uniform manner. In some cases, this may be achieved by spacing the extractors uniformly across the reflective surface 35. Additionally, in some embodiments, the light extractors may be of uniform size and/or shape. However, uniformity in such a situation may be difficult in part because extractors 40 closer to the light source 15 (or 16) may intercept the light before it reaches the center of the lightguide, or because light diffuses or experiences losses and is less concentrated as it nears the center of the lightguide 10. For thin, narrow light guides such as this, extractor distribution is mostly governed by the need to increase reflection efficiency as the internal light bath depletes from previous emission in progressing down the guide. Accordingly, in at least some embodiments, light extractors are spaced progressively closer the further they are positioned away from the light sources. In another case, such as that illustrated in FIG. 8B, the light extractors may be larger both in width and/or height as the features move further from a light source. It is to be understood that both shape and spacing of light extractors may be uniform or vary and fall within the scope of the invention. As illustrated in the examples section, extractors may be varied in size according to given functions in order to provide a uniform illuminance distribution.

Figure 5A:
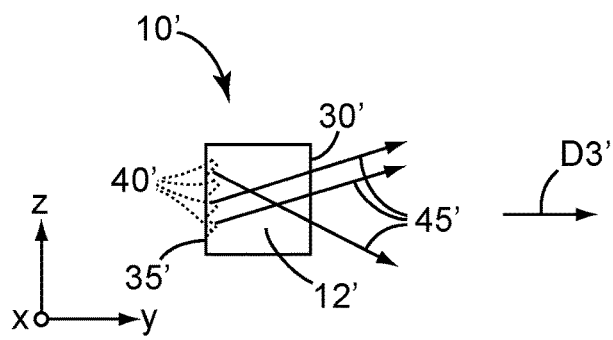
FIG. 5A-5B show cross-sectional views of two different lightguides.
Figure 5B:
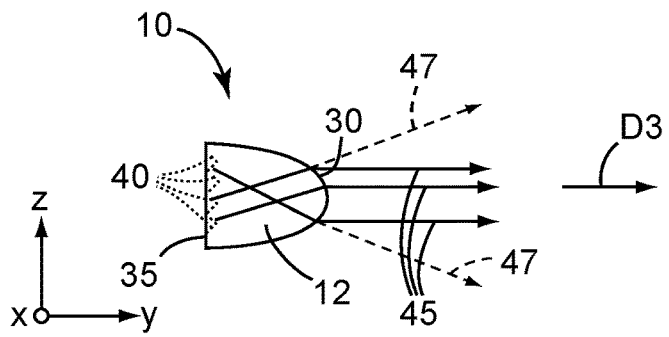

In addition to the re-direction of light along a y-direction by means of the light reflecting surface 35, the lightguide of the present description is capable of directing light in another dimension by means of the light emitting surface 30. Specifically, the light emitting surface 30 is configured to direct light into the x-y plane. This phenomenon is illustrated in FIGS. 5A and 5B. FIG. 5A shows a cross-sectional profile view of lightguide 10', in which the light emitting surface 30' is flat. Here, light reflected off of extraction features 40' on reflecting surface 35' is directed with at least some component in the z-direction. When incident upon light emitting surface, 30' it will generally travel through the surface and be emitted as light 45' with a substantial z-component, outside of any refraction that may occur at the emission surface face due to differential in index of refraction between the lightguide 10' and outside medium (e.g. air).

In stark contrast, FIG. 5B illustrates some embodiments of a lightguide according to the present description. Light reflected from surface 35 is incident upon light emitting surface 30. In this embodiment, the light emitting surface is configured to direct, and does direct light 45 generally into a direction D3 that corresponds to a direction within the x-y plane (on average). Here, light emitting surface 30 has a curved y-z profile, which results in collimating the light 45 into the x-y plane. In at least some embodiments, including those illustrated in FIGS. 4 and 6, the light emitting surface 30 will have a convex yz-profile. In some embodiments, the light emitting surface will have an aspheric yz-profile. Other suitable curved cross-sectional profiles for the emitting surface can include, for example, concave, hemispheric or prismatic shapes, among others. In some embodiments, including the aforementioned prismatically shaped emission surface, the emission surface may include facets. In given embodiments, the front surface may also be flat (as in FIG. 5A), as long as the plurality of light rays 45 are emitted generally in the x-y plane.

As with the altered directionality of light reflected by extractors, 40 towards the y-direction, not all of the light refracted by light emitting surface 30 will fall within the x-y plane. It will be understood that the average directionality of light emitted by surface 30 will fall along the x-y plane, and portions of light will fall at an angle above or below the x-y plane in the z-direction (see, for example, light rays 47 in FIG. 5B). All light rays emitted from surface 30 should generally fall within an angle of the x-y plane of less than 50-degree, 45-degree, 40-degree, 35-degree, 30-degree, 25-degree, 20-degree, 15-degree, or even within a 10-degree deviation from direction D3 (corresponding to the xy-plane).

Additionally, although as described above, the light extractors 40 on light reflecting surface 35 will generally collimate light towards the y-direction within the x-y plane, the light extractors may also be shaped and oriented such that they direct light either into the x-y plane, or potentially out of the x-y plane, where this is a desired effect. Potential examples of light extractor orientation and shape for achieving such an effect (and other potential effects) may be found in commonly owned and assigned PCT Publication No. WO 2011/008473 (Ender), which is hereby incorporated by reference in its entirety.

Figure 19:
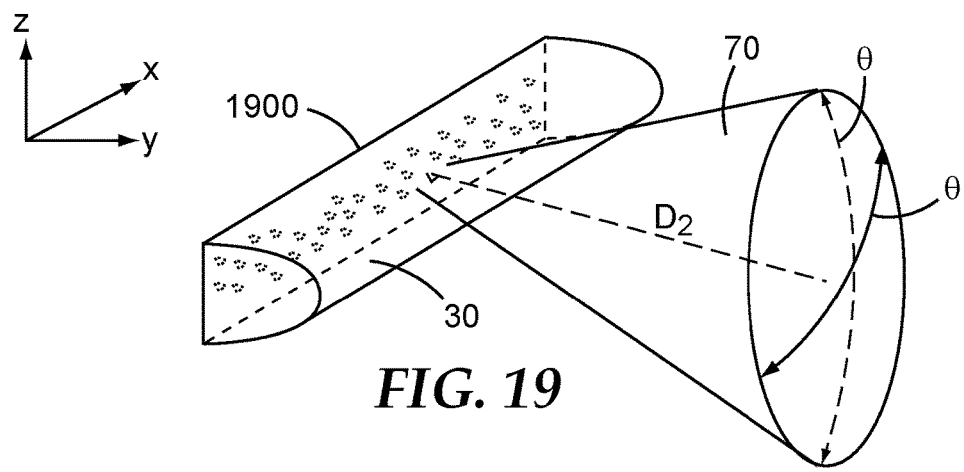
FIG. 19 shows a perspective view of an exemplary embodiment of a lightguide of the present disclosure.

As light generally travels (on average) in the y-direction but may experience deviation both within the x-y plane and also in the z-direction, it is also useful to understand the emission direction of the lightguide 10 according to a cone angle. As illustrated in FIG. 19, a light guide 1900 may emit light generally along the y-direction (here shown by dashed line D2). However, the cone angle across the cone of light emitted (θ) will be less than 100 degrees, less than 90 degrees, less than 80 degrees, less than 70 degrees, less than 60 degrees, less than 50 degrees, less than 40 degrees, less than 30 degrees, or even less than 20 degrees.

In some embodiments, a lightguide of the present disclosure can be curved along its elongated length (i.e., "arched"). Referring back to FIG. 2A, lightguide 20 is shown as being disposed on safety spectacles 2 having a curved front portion, and lightguide 20 is arched to conform to that curved front portion of the safety spectacles. The light emitting surface and plurality of light extractors can be configured to at least partially compensate for light direction characteristics of the lightguide that is arched.

In some embodiments, a lightguide of the present disclosure is elongated to a length suitable for disposing the lightguide on a user-wearable article, for example, safety spectacles. In some typical embodiments, the lightguide has a length in the range of about 5 to 20 centimeters, spanning roughly across a wearer's forehead. In a preferred embodiment, the lightguide may have a length in the range of 10 to 15 centimeters. Additionally, the length of the lightguide (along the x-direction generally) will be much greater than the width of the light guide (in either the y-direction or z-direction). The ratio of length to width of the lightguide may be at least 8 to 1, or at least 10 to 1, or at least 12 to 1, or at least 20 to 1, 30 to 1 or even 40 to 1.

A lightguide of the present disclosure is typically made of a transparent or semi-transparent material, and typically may be a transparent plastic. A suitable transparent plastic includes, for example, optical grade polycarbonates, acrylics (PMMA), and urethanes such as TRIVEX.

Figure 18:
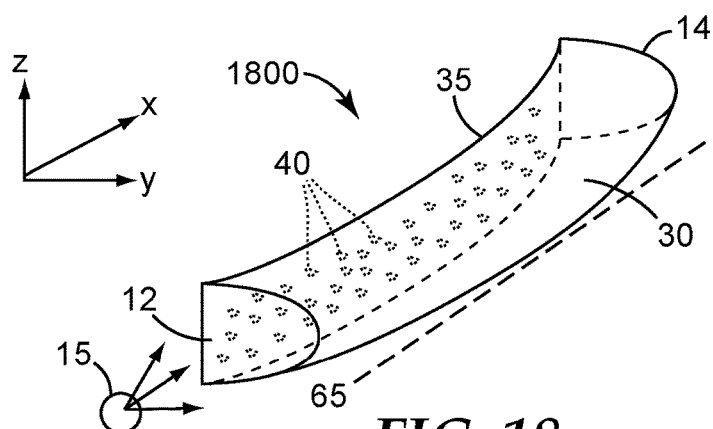
FIG. 18 shows a perspective view of an exemplary embodiment of a lightguide of the present disclosure.

Because a variety of lightguide shapes may be used (including, e.g., an arched lightguide), the plurality of light extractors can be arranged or shaped to compensate for the spreading of light due to the shape of the lightguide. For example, at times the light extractors must compensate for an arched lightguide in the x-y plane as illustrated in FIG. 18. Here, the lightguide 1800 may be arched such that the back reflective surface 35 conforms to the surface of the wearable device which the user is wearing (where such a device has a convex front surface). As usual, light from light source 15 enters the lightguide at first surface 12, and is directed generally towards second surfaced 14. A second light source (not shown) may also emit light into the second surface 14 of the lightguide and direct light towards first surface 12.

As the lightguide has both a curved emitting surface 30 and reflecting surface 35 in its xy profile, the initial direction along which the lightguide extends will not be the x-direction. It will first be on average a given degree shift (e.g. 10 or 15 degrees) to one side of the x-direction, and as it nears the second end 14 of lightguide will be traveling in a direction (again on average) approximately the same degree shift to the opposite side of the x-direction. Still, the average direction along which the light emitting surface extends may be captured by the tangential line that may be drawn from the front, middle of the emitting surface 30. This tangential line is defined in the figure by element 65, and is parallel or equivalent to the x-direction. Thus, the light emitting surface will be understood as extending generally in an x-direction between the first and second ends. Given the necessity of the extractors 40 to direct light towards the y-direction, at potentially more drastic angles near first surface 12 and second surface 14, the light extractors near the surface may have to include more drastically angled facets, for example.

In some embodiments, the light reflecting surfaces of each of a plurality of light extractors is varied in a systematic way so that light reflected out of the lightguide propagates in a predetermined manner. The light reflecting surfaces of the light extractors can be curved or flat (i.e., concave or convex, having negative or positive sag, respectively, or having facets). For example, in some embodiments the light extractors can be any of prisms, cones, aspheric cones, truncated aspheric cones, hemispheres, wedges having negative cylindrical sag, or wedges having positive cylindrical sag. The sag ratio of a wedge with sag may be defined as the center-line droop to extractor width. The sag is cylindrical rather than spherical to maintain the general facet angle which impacts the general direction of the emitted output. The degree of sag influences the angular distribution gradient, "softening" the emission. But as the departure from zero curvature progresses, the angular gradient in the emission softens (becomes less steep). Sag ratios with absolute value greater than or equal to 0.05 and less than or equal to 0.15 are exemplary.

Figure 20:
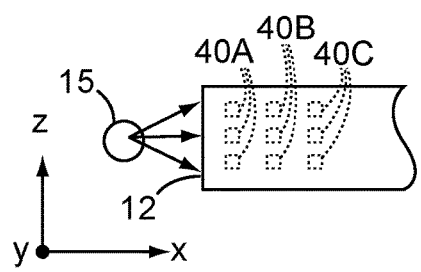
FIG. 20 shows a front view of an exemplary embodiment of a lightguide of the present disclosure.

In some embodiments, the light reflecting surfaces of the light extractors can be directionally oriented. For example, in FIG. 20, the extractors may be positioned such that they optimally interact with light from light source 15. Here, light extractors 40A closer to the first surface 12 may be positioned such that the facets more directly face the light emitted at higher angles. Light extractors 40B may be angled less than extractors 40A as less off-axis light may be incident upon such extractors and light extractors 40C even further from first surface 12 may have little to no angle away from normal. The opposite may also be true. Light extractors 40A closer to the first surface 12 may be oriented such that they face the light emitted at lesser angles than extractors further from the light source. Generally, it will be beneficial or potentially even necessary to vary the extractor wedge angle according to position within the lightguide in order to compensate for light guide curvature. This allows the emission angle distribution to remain narrow despite vastly different angles of light emitting surface.

Behind the light reflecting surface of the lightguide, in some cases there is a supplemental back reflector to reflect some of the light that exits the lightguide towards the viewer's head, back into the forward, surface or viewing direction. The supplemental back reflector can be specular or diffusive in nature, and can also assume different shapes such as flat, curved, segmented or conforming to the underlying shape of the headgear.

In front of the light emitting surface of the lightguide, in some cases there can be one or more films in place to further collimate light in the forward direction, or change the light direction according to design. Usually the film(s) contains microstructures in it, although random or quasi-random structured surface diffusers can be used in some applications.

The supplemental back reflector and the front film stack can be laminated to the lightguide using low refractive index adhesives. One can also design a housing to place the components together. For example, the housing encloses the lightguide and the back side of the housing contains the supplemental back reflector while the front side of the housing has the opening and also the film (stack). As noted above, light sources (e.g. 15) may be LEDs. In particular embodiments, a single LED may be positioned at first end 12 and a reflective surface may be provided at second end 14. In other embodiments a single LED may be positioned both at first end 12 and at second end 14. In yet other embodiments a plurality of LEDs may be positioned at one or both of first end 12 and second end 14. The LEDs utilized may be white LEDs, single or multi-color LEDs, or potentially even LW LEDs, used in fluorescence applications. Generally, the LEDs will be oriented such that a primary emitting surface of the LED is directed towards an end (12 or 14) of the lightguide through which light may enter the lightguide.

LEDs may be powered by various suitable power sources. In at least some embodiments, the LEDs will be wired to a battery system. Where LEDs are positioned at both the first end 12 and second end 14, preferably the LEDs may be wired in series through a common circuit, such that they are powered by a common battery or batteries and activated by one or more switches. Light output from an LED is proportional to the current conducted through the device. The circuit driving the LED should provide a regulated current to the LED devices. The circuit should ideally be formed such that the LEDs may maintain consistent light levels until the battery level drops below a given cutoff voltage. The circuit will adjust gain internally so that the output current to the LEDs does not vary significantly.

Figure 23:
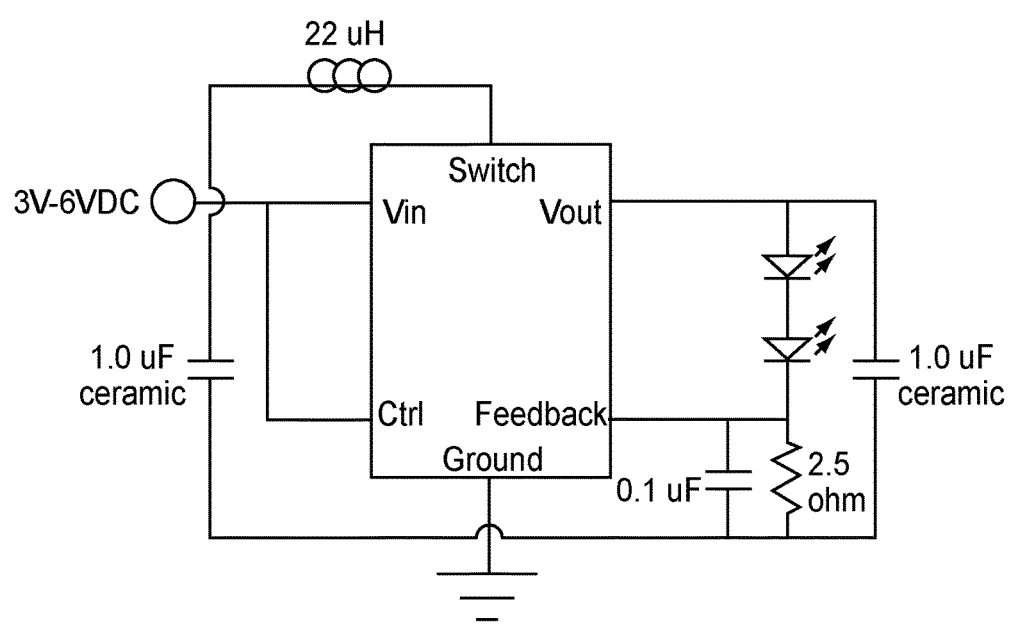
FIG. 23 shows a circuit diagram for light sources used in present disclosure.

For safety spectacles, the ability to predict the light output is important. While a simple resistor network could provide the necessary current, as the battery voltage is diminished, so too would be the light output of the LED. A small battery such as a standard CR2032 button type may be used to power such spectacles in single or multiples due to its small form factor. This form factor can be integrated into the frame of the spectacles. This battery type has a capacity of 180-200 mAH. The LED driver circuit will compensate for the battery's diminishing voltage as it ages with use, maintaining a more constant and predictable light output. For higher brightness or longer operating duration, AAA, AA, 9V, or rechargeable lithium ion batteries (for example) may be mounted remotely and provide significantly greater electrical power capacity. FIG. 23 (discussed later in the Examples section) provides an example of an LED driver configured to boost the input voltage and provide controlled output current to a set of series-connected LEDs.

Figure 9:
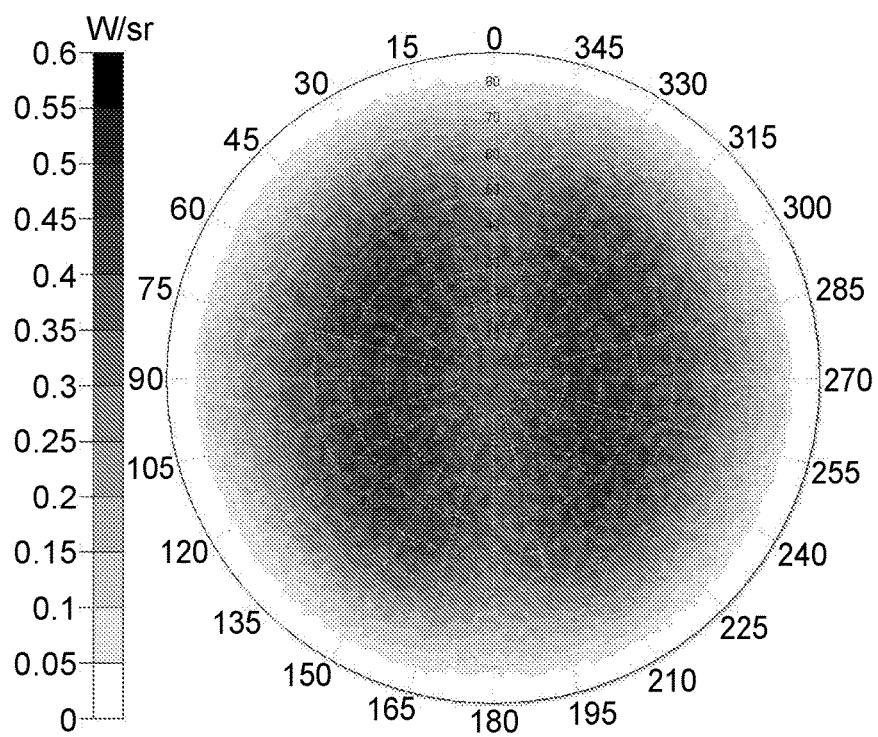
FIG. 9 is a plot of luminous intensity from a lightguide surface of the present disclosure.
Figure 10:
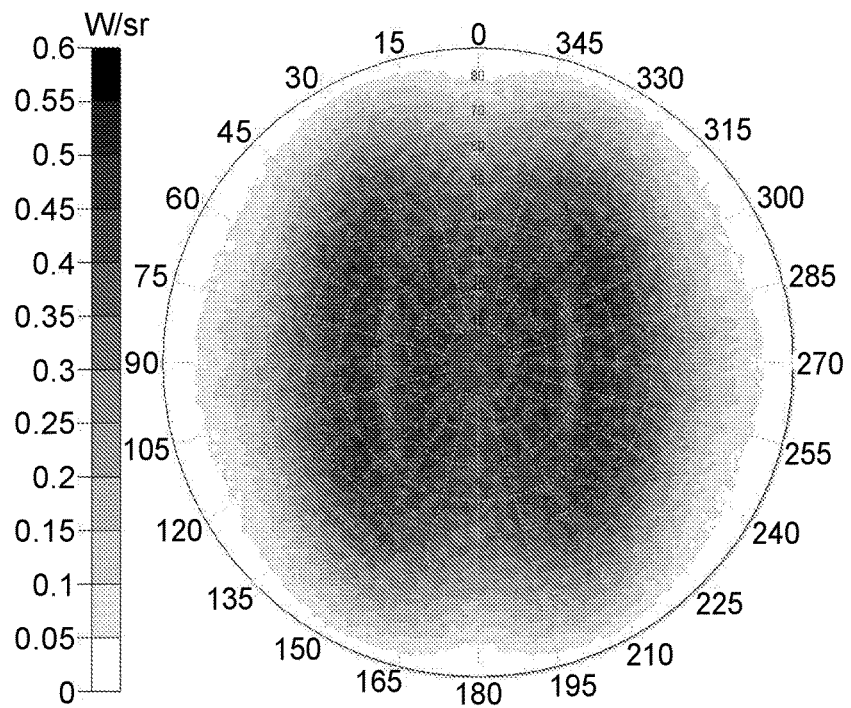
FIG. 10 is a plot of luminous intensity from a lightguide surface of the present disclosure.
Figure 11:
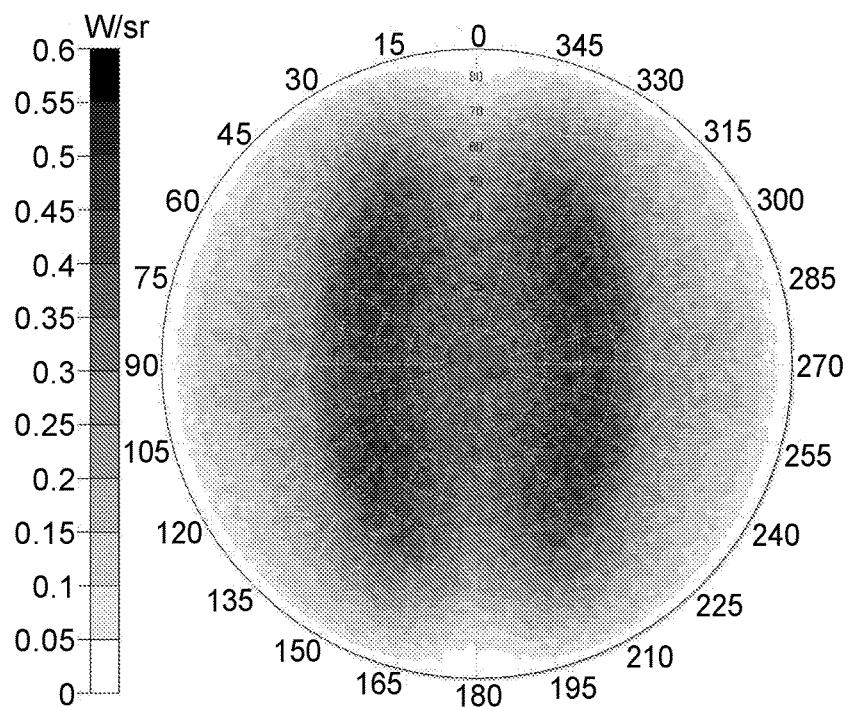
FIG. 11 is a plot of luminous intensity from a lightguide surface of the present disclosure.

Another way of understanding exactly what function the lightguide performs is to state that the lightguide emits quasi-collimated light. FIG. 9 shows the angular output pattern of a lightguide where the light emitting surface has a flat profile. The lightguide is a long and narrow with a square shaped cross section with hemi-spherical extractors (comparable to the example shown in FIG. 5A. As is readily apparent, the light is generally not collimated in any direction. For comparison, FIG. 10 shows the angular output pattern of a lightguide where the light emitting surface has a cylindrical profile (such that the light is at least collimated towards the x-y plane). Immediately apparent in FIG. 10 is the fact that the pattern is compressed across the light guide direction (again, the x-y plane), indicating some level of collimation. Even greater collimation can be achieved with a light emitting surface having an aspheric profile, as shown in FIG. 11. For the lightguide modeled in FIG. 11, the light emitting surface has a profile that is an extruded half-ellipse with a long axis perpendicular to the bottom surface (ratio between long axis and short axis is 1.5). Proper selection of light extraction features and distribution results in further collimation towards the y-direction.

Wearable Devices

Illumination articles can include any suitable wearable device having a lightguide of the present description disposed thereon. The following examples illustrate embodiments that are generally worn on the head of a wearer.

Referring again to FIG. 1, illumination article 1 includes safety spectacle 2 as the wearable device. Safety spectacles 2 include first and second side temple pieces extending rearward from first and second attachment points located proximate to the first and second ends of the lightguide, respectively, the first and second attachment points defining a frontal portion of the safety spectacles therebetween, wherein the frontal portion comprises at least one frontal lens portion distinct from the lightguide.

Figure 12:
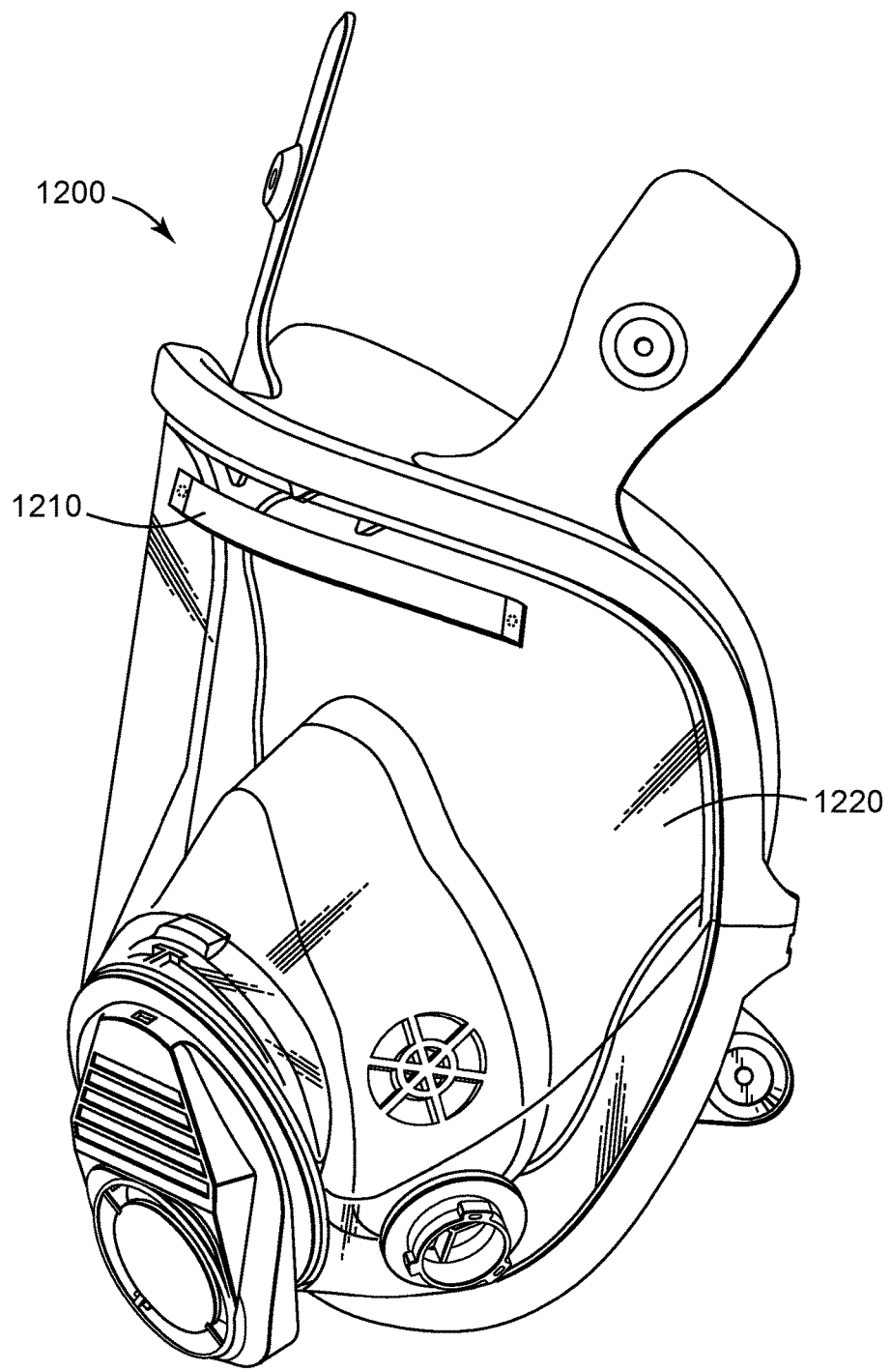
FIG. 12 shows a perspective view of an exemplary embodiment of an illumination article of the present disclosure.

Another potential illumination article 1200 is illustrated in FIG. 12. Here, the wearable device is a full face respirator 1220. Lightguide 1210 disposed on the full face respirator 1220. Given the curved x-y profile of the respirator 1220, the present embodiment may be one in which lightguide 1210 has an arched profile in the x-y plane. In fact, as generally all of the wearable devices contemplated in the present description are meant to fit a face profile, they all could be designed for an arched profile (or a straight one).

Figure 13:
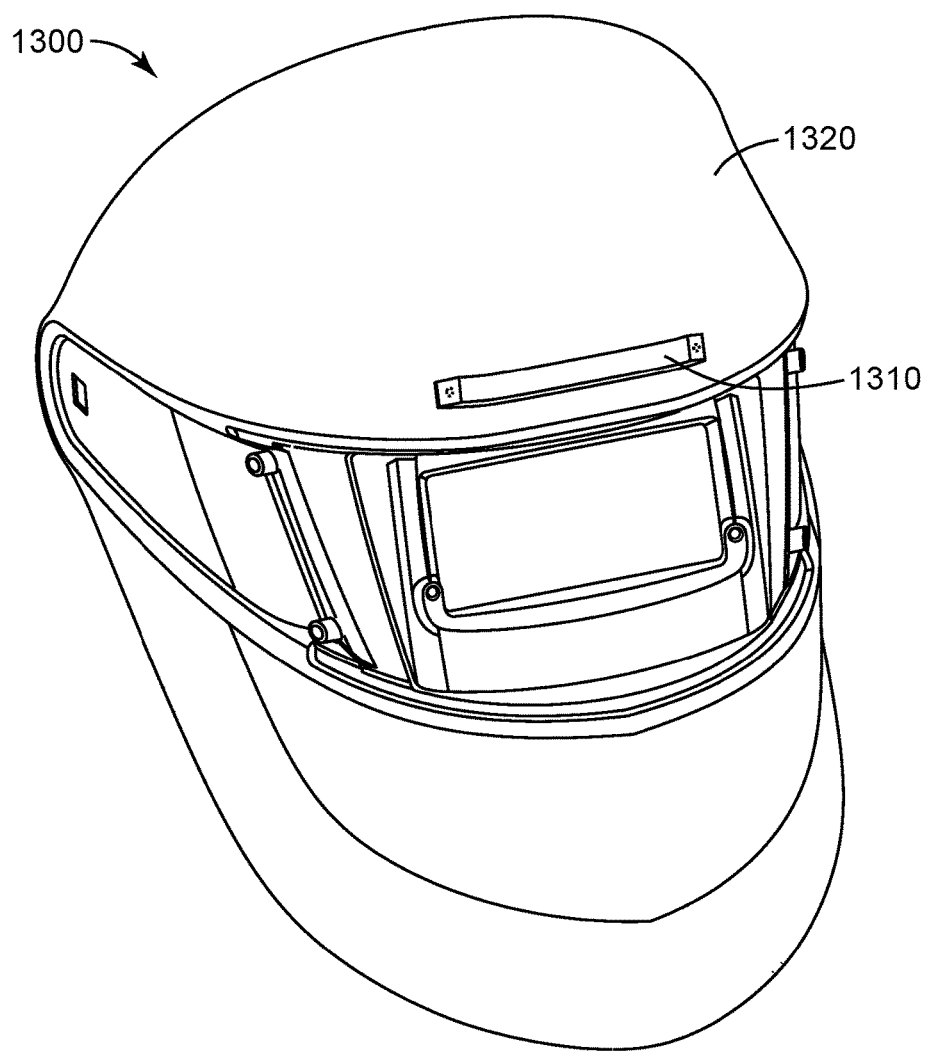
FIG. 13 shows a perspective view of an exemplary embodiment of an illumination article of the present disclosure.
Figure 14:
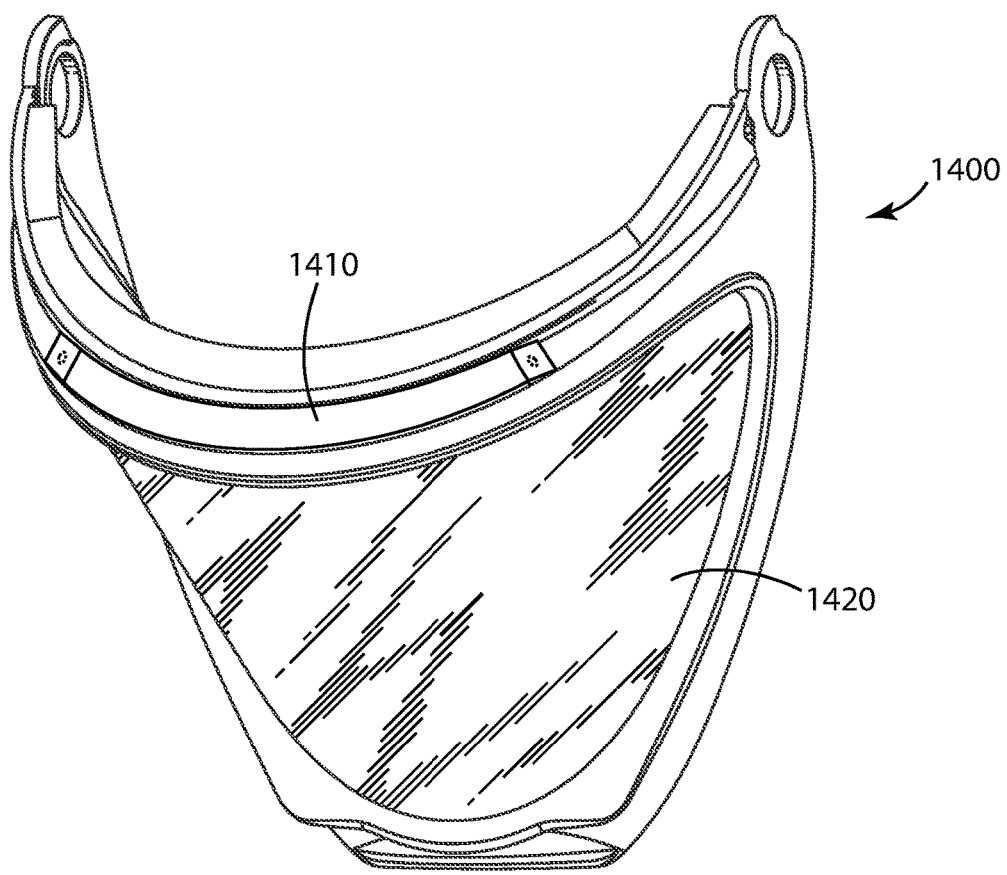
FIG. 14 shows a perspective view of an exemplary embodiment of an illumination article of the present disclosure.
Figure 15:
FIG. 15 shows a perspective view of an exemplary embodiment of an illumination article of the present disclosure.

FIG. 13 illustrates yet another illumination article 1300. In this embodiment, illumination article 1300 includes a lightguide 1310 that is positioned on welding helmet 1320. FIG. 14 illustrates illumination article 1400. Illumination article 1400 includes a lightguide 1410 that is positioned on a face shield 1420. The face shield embodiment is yet another potentially appropriate embodiment in which the lightguide 1410 may have an arched profile in the x-y plane. FIG. 15 provides illumination article 1500. Illumination article 1500 includes a light source 1510 that is positioned on a power suit or hooded suit 1520, where such a suit is a head top for a powered respirator.

Figure 16:
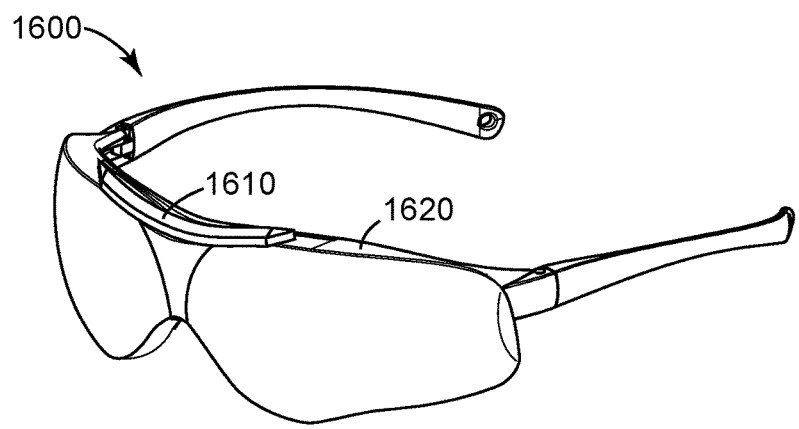
FIG. 16 shows a perspective view of an exemplary embodiment of an illumination article of the present disclosure.
Figure 17:
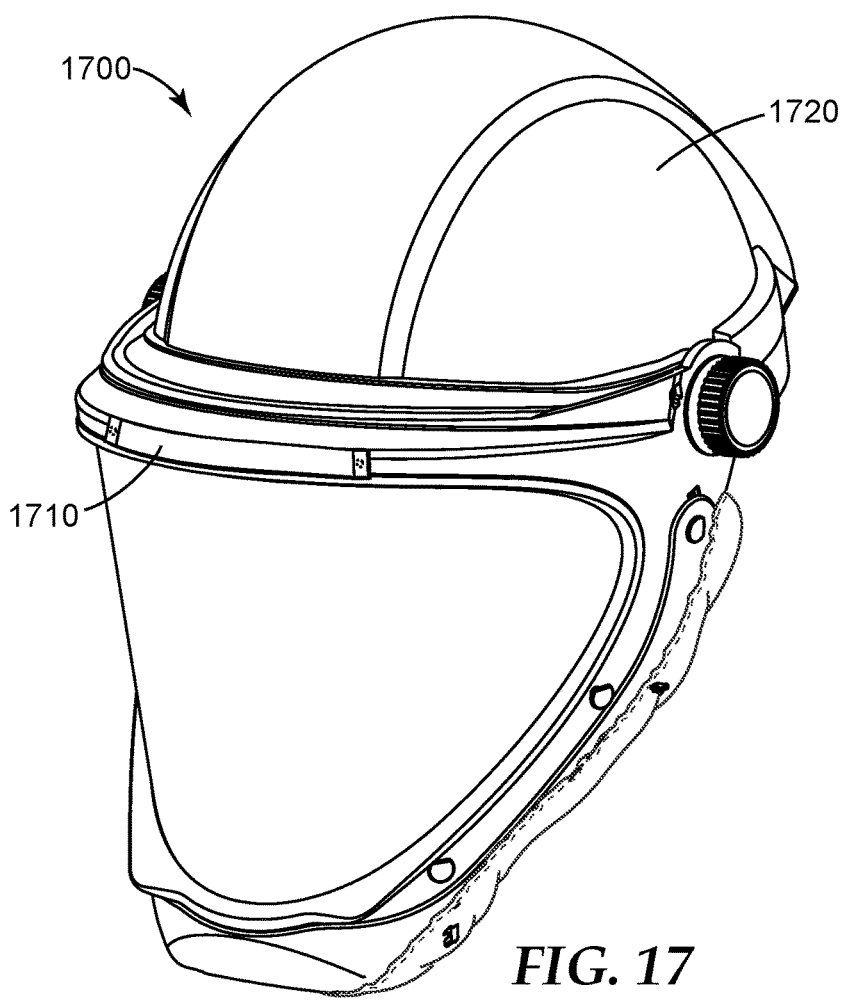
FIG. 17 shows a perspective view of an exemplary embodiment of an illumination article of the present disclosure.
Figure 22:
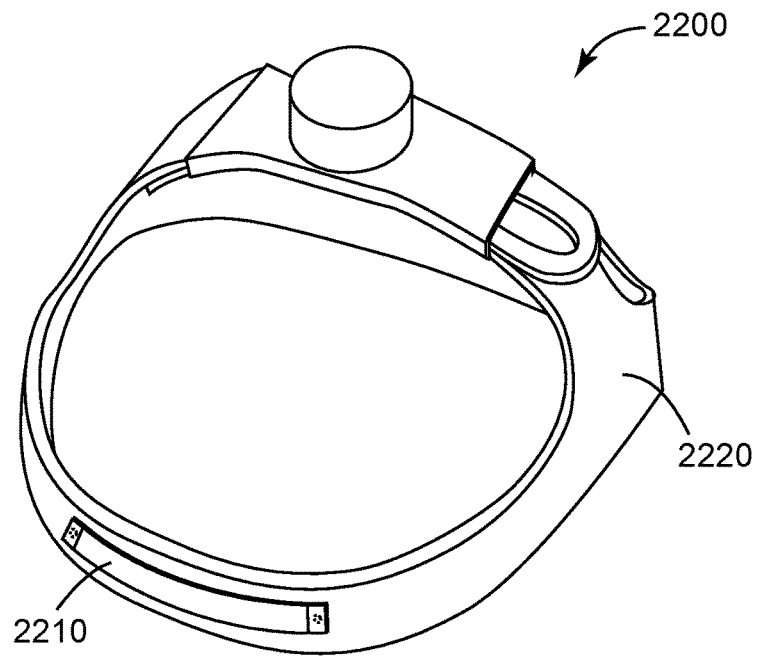
FIG. 22 shows a perspective view of an exemplary embodiment of an illumination article of the present disclosure.

FIG. 16 provides yet another exemplary embodiment of an illumination article 1600. Here, rather than being safety spectacles, the wearable device includes reading spectacles 1620. The lightguide 1610 is disposed on reading spectacles 1620 in much the same manner as that in the safety spectacles example. FIG. 17 provide for another illumination article 1700. Here lightguide 1710 is disposed on a mining helmet 1720. Mining helmet applications may be especially appropriate applications of the present description. The absence of any ambient light makes an observer's eyes especially sensitive to glare when directly viewing the emission of a colleague's safety lamp. Finally, FIG. 22 provides an illumination article 2200. Lightguide 2210 is disposed on a medical headset 2220. Medical headset may be any appropriate headset worn in surgical or dental applications. Lightguide 2210 may be used to illuminate either a surgical area in medical applications or oral area in dental applications. In either case, the present description provides a lightweight solution with less shadows (such as those created by a users hands intercepting light on the way to a working surface) than traditional headlamps used in surgery or dentistry.

Lightguides may be disposed and secured to the wearable device by any number of suitable means depending on the wearable device on question. In at least some embodiments, the lightguide will be attached to the accompanying wearable device by adhering the lightguide to the front surface of the wearable device. In the case of safety spectacle or goggles, this may be along the frame of the spectacles or goggles above the lenses. The strength of the adhesive necessary will depend on the application in question, and potential working environment to which the wearable device will be exposed (heat, moisture, particulates, etc.). In some cases, the lightguide may be mechanically attached to the wearable device by sliding or clipping the lightguide into some sort of housing or bracket, or potentially by clamping the lightguide to the wearable device. Because light may be guided through total internal reflection in much of the guide, whatever means used to secure the guide to the wearable device should either allow for a small air gap between the guide and the fixture or else the guide must have reflective coatings on all but the emitting surface or else it must be secured in a reflective bracket or have a supplemental back reflector (as discussed previously). If the air gap approach is chosen, it is permissible for spot attachment in regions close to the corners of the end surfaces where light loss will be minimal.

Any other number of attachment means are also contemplated, so long as they are appropriate to function in the environments required, and withstand heat generated by the LEDs. Unlike incandescent lights, the LED's heat is conducted through the semiconducting die, not radiated. For low to moderate level lighting, the LED may consume 10-100 mW and the thermal rise caused by the LED should not normally be a concern. For inspection or other high brightness uses, each LED may dissipate one Watt or more of heat. In such cases, careful placement, use of low thermal resistance materials, and the design of heat spreading and heat sink elements may be required. It is important to keep the structure of the spectacles cool enough for the wearer to handle. It is equally important to maintain the temperature of the LED die in a safe operating zone for maximum lifetime and optical efficiency.

Figure 21A:
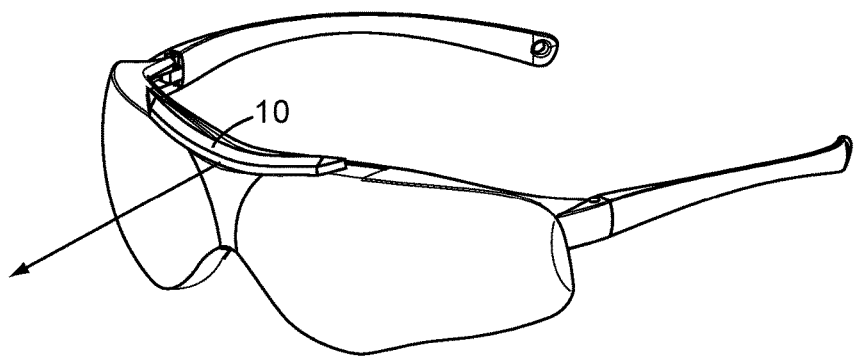
FIGS. 21A-C show perspective views of an exemplary embodiment of an illumination article of the present disclosure.
Figure 21B:
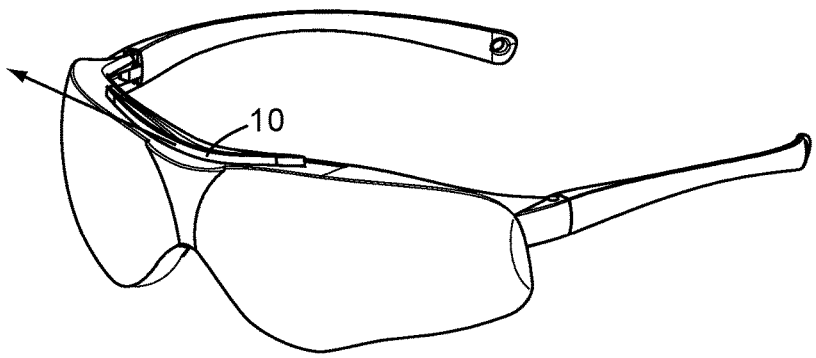
Figure 21C:
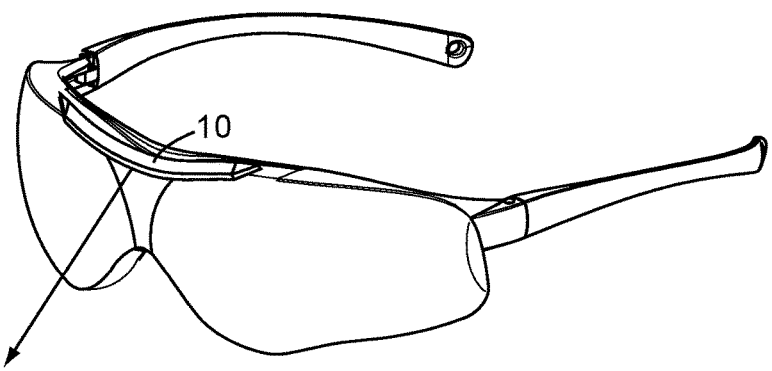

In some embodiments, the lightguide in question may be either tilted or capable of being tilted by the user. An example of one such embodiment is illustrated with respect to FIGS. 21A, B and C. In FIG. 21A, the lightguide direct light generally straightforward into the x-y plane as shown in the remainder of the embodiments. However, in FIG. 21B, the lightguide is tilted, such that the emissions surface directs light generally in a positive z-direction above the x-y plane. FIG. 21C illustrates the opposite case, in which the lightguide directs light in a negative z-direction below the x-y plane. The lightguide may, in such an embodiment, be capable of tilting by the user through a hinge mechanism or other appropriate mechanism. It may achieve this tilt or pivot by use of a pivot point at one or both ends of the lightguide, or potentially along the length of the lightguide.

The following are exemplary embodiments according to the present disclosure:

Item 1. An illumination article comprising:
  a wearable device configured for wearing on the head of a wearer;
  a lightguide disposed on the wearable device, wherein the lightguide is elongated and has a first end and a second end opposite the first end; and
  a first light source positioned at the first end, for emitting light into the lightguide;
  wherein the lightguide further comprises:
    a light emitting surface extending generally in an x-direction between the first and second ends; and
    a light reflecting surface positioned opposite to the light emitting surface;
  wherein the light reflecting surface comprises a plurality of light extractors configured for directing light in a y-direction perpendicular to the x-direction, and
  wherein the light emitting surface is configured for directing light into an xy-plane.

Item 2. The illumination article of item 1, further comprising a second light source positioned at the second end, for emitting light into the lightguide.

Item 3. The illumination article of item 1 or 2, wherein at least some of the light extractors in the plurality of light extractors are configured to convert a plurality of light rays light generated by the first light source into a quasi-collimated light beam.

Item 4. The illumination article of any one of items 1-3, wherein at least some of the light extractors in the plurality of light extractors each include an extractor light reflecting surface and wherein the extractor light reflecting surfaces are varied in a systematic way so that light reflected out of the lightguide propagates in a predetermined manner.

Item 5. The illumination article of any one of items 1-4, wherein the extractor light reflecting surface in at least some of the light extractors are curved.

Item 6. The illumination article of item 5, wherein the extractor light reflecting surface in at least some of the light extractors is convex.

Item 7. The illumination article of any one of items 1-5, wherein the extractor light reflecting surface in at least some of the light extractors is concave.

Item 8. The illumination article of any of items 1-4 wherein the extractor light reflecting surface in at least some of the light extractors comprises facets.

Item 9. The illumination article of any one of claims 1-8, wherein at least a portion of the light emitting surface has a curved yz-profile.

Item 10. The illumination article of item 9, wherein at least a portion of the light emitting surface has a convex yz-profile.

Item 11. The illumination article of item 10, wherein at least a portion of the light emitting surface has an aspheric yz-profile.

Item 12. The illumination article of item 1, wherein the light emitting surface comprises facets.

Item 13. The illumination article of any one of items 1-12, wherein the wearable device comprises safety spectacles.

Item 14. The illumination article of item 13, wherein the safety spectacles comprises first and second side temple pieces extending rearward from first and second attachment points located proximate to the first and second ends of the lightguide, respectively, the first and second attachment points defining a frontal portion of the safety spectacles therebetween, wherein the frontal portion comprises at least one frontal lens portion distinct from the lightguide.

Item 15. The illumination article of any one of items 1-12, wherein the wearable device comprises safety goggles.

Item 16. The illumination article of any one of items 1-12, wherein the wearable device comprises a face shield.

Item 17. The illumination article of any one of items 1-12, wherein the wearable device comprises a full face respirator.

Item 18. The illumination article of any one of items 1-12, wherein the wearable device comprises a head top for a powered respirator.

Item 19. The illumination article of any one of items 1-12, wherein the wearable device comprises a mining helmet.

Item 20. The illumination article of any one of items 1-12, wherein the wearable device comprises reading spectacles.

Item 21. The illumination article of any one of items 1-12, wherein the wearable device comprises a medical headset.

Item 22. The illumination article of any one of items 1-12, further comprising a pivot point at one or both of the opposed ends of the lightguide, light may be directed into a plane outside of the x-y plane.

Item 23. The illumination article of any one of items 1-12, wherein the light emitting surface comprises an arched profile in the xy-plane.

Item 24. The illumination article of any one of items 1-12, wherein at last some of the light extractors are wedge-shaped.

Item 25. The illumination article of item 24, wherein the light extractors comprise wedge-shaped extractors with negative cylindrical sag.

Item 26. The illumination article of item 24, wherein the light extractors comprise wedge-shaped extractors with positive cylindrical sag.

Item 27. The illumination article of any one of items 1-12, further comprising a supplemental back reflector positioned opposite the light reflecting surface from the lightguide, the supplemental back reflector comprising a curved y-z profile.

Item 28. The illumination article of item 27, wherein the supplemental back reflector is convex, concave or aspherical.

EXAMPLES

Example 1: Safety Spectacles

A prototype light guide was made for safety spectacles to illustrate improvements to the more standard approach of point-source LEDs mounted on the temples or LED headlamps as a separate piece.

The light guide was about 158 mm long and had a cylindrical top surface as the emission surface. RENCAST 140 (a clear epoxy) was molded into the designed shape and laser ablation was used to create extraction features on the surface opposite the emission surface. These features assumed a nominally aspheric shape. The light guide was bent a little to conform to the curvature of the safety spectacles and put inside a thin metal housing, the backside of which worked as a reflector (in this example, enhanced specular reflector (ESR) was used). Two LEDs were mounted inside the housing on each end of the light guide as light sources.

The LED injected light directly into the end of the light guide. The LED height was similar to the lightguide height, providing for simple alignment and coupling. A small circuit board lip extended beyond the edge of the LED base to provide a bottom reference platform for optical waveguide.

In order to maintain a uniform light intensity across lightguide mounted to the spectacles, and over a reasonable range of battery voltage change, a small boost converter with a constant current output was incorporated into the spectacle design. The LEDs were mounted on opposite sides of the light guide—mechanically in parallel. Electrically, however, they were in series, assuring the same current was seen by each LED and resulting in a very good brightness match on each side of the waveguide. Further, as a battery was drained of its charge, the output voltage drop was compensated for by the DC converter in the LED constant current source. The LEDs saw the same electrical current over voltage variations until the battery no longer had the power to maintain sufficient charge for the LED set point.

Figure 24:
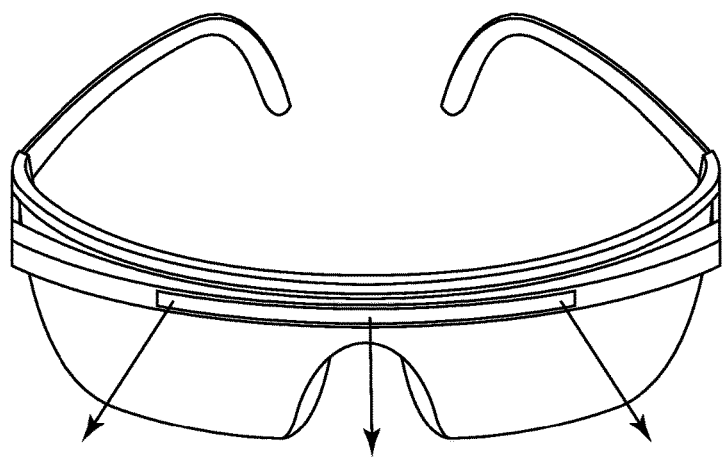
FIG. 24 shows a photograph of an exemplary embodiment of an illumination article of the present disclosure.

The intended brightness, and desired operating life determined the battery size and capacity chosen for a given application. The constant current "light engine" needed to be flexible and efficient enough to handle these electrical variables. An example of such a boost converter/constant current circuit is shown in the schematic diagram in FIG. 23. In this example, the LED Controller Circuit is located remotely from LEDs at the battery pack location which may rest behind or to the side of the wearer's body. A photograph of the final example in operation is illustrated in FIG. 24.

Example 2: Mining Helmet/Face Shield

A prototype assembly of light guide, light engine, and mounting bezel was made with matching curvature to fit into the forehead section of the face shield used with the 3M AIRSTREAM Mining Headgear. The flexible polyurethane light guide was 127 mm long, and 7 mm wide. Because of the curvature of the face shield, extractors were designed for a more focused distribution in the horizontal plane. (Alternatively, the supporting bezel assembly could be flat, sticking out more from the face shield in which case less focusing is needed.) In this example, the lightguide emitting surface had a rectangular cross-section.

Because of the more extreme curvature of the face shield, a Two-Photon Lithographic process was used to create a master tool for the extraction features. The tool formed the bottom surface (corresponding to the bottom surface of the light guide) of a flat mold made to the desired light guide dimensions. A detailed understanding of forming extraction features by this method may be found in the previously referenced commonly owned U.S. Pat. No. 7,941,013 to Martilla.

Figure 25:
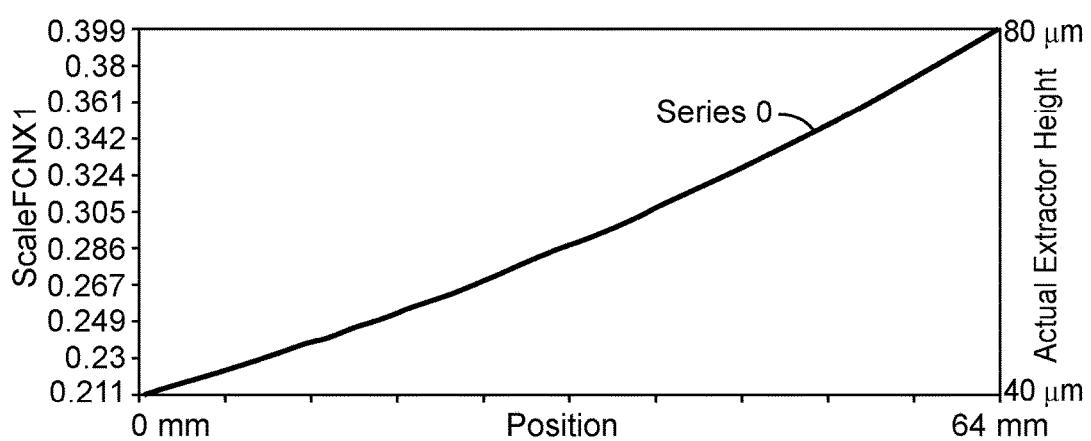
FIG. 25 shows a plot of a function used to scale extractor size.

The extractors were similar in shape to FIG. 7A (45 degree, sag ratio equal to +0.05) to produce a uniform emission. The extractor size was scaled according to the following function (plotted in FIG. 25) designed to give uniform illuminance to a dummy plane just above the light guide surface:

$$S(x)=0.22*\exp(x/107.3)*(1-0.04\cos((\pi x)/130))$$

Figure 26A:
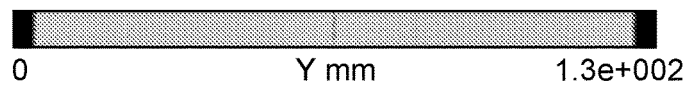
FIGS. 26A-B show plots of simulated illuminance distribution.
Figure 26B:
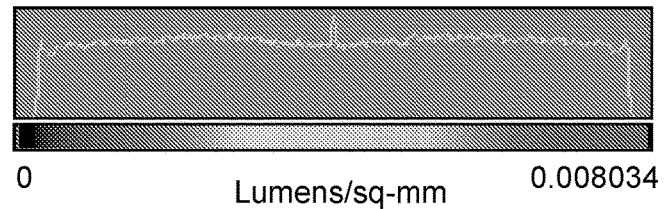
Figure 27B:
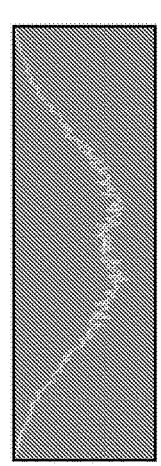
FIGS. 27A-C shows plots of simulated intensity distribution.
Figure 27A:
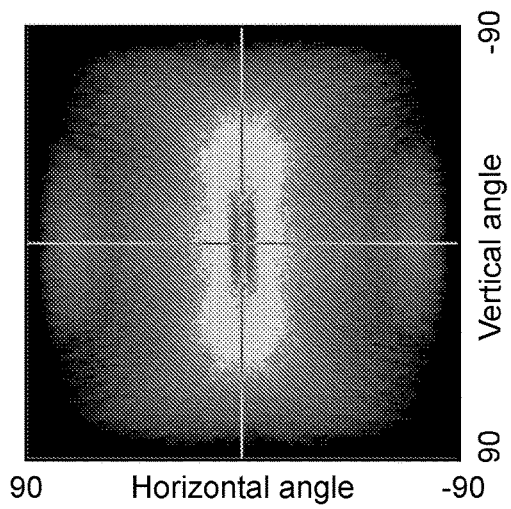
Figure 27C:
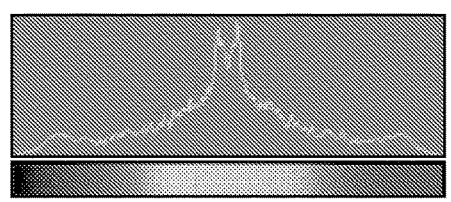
Figure 28:
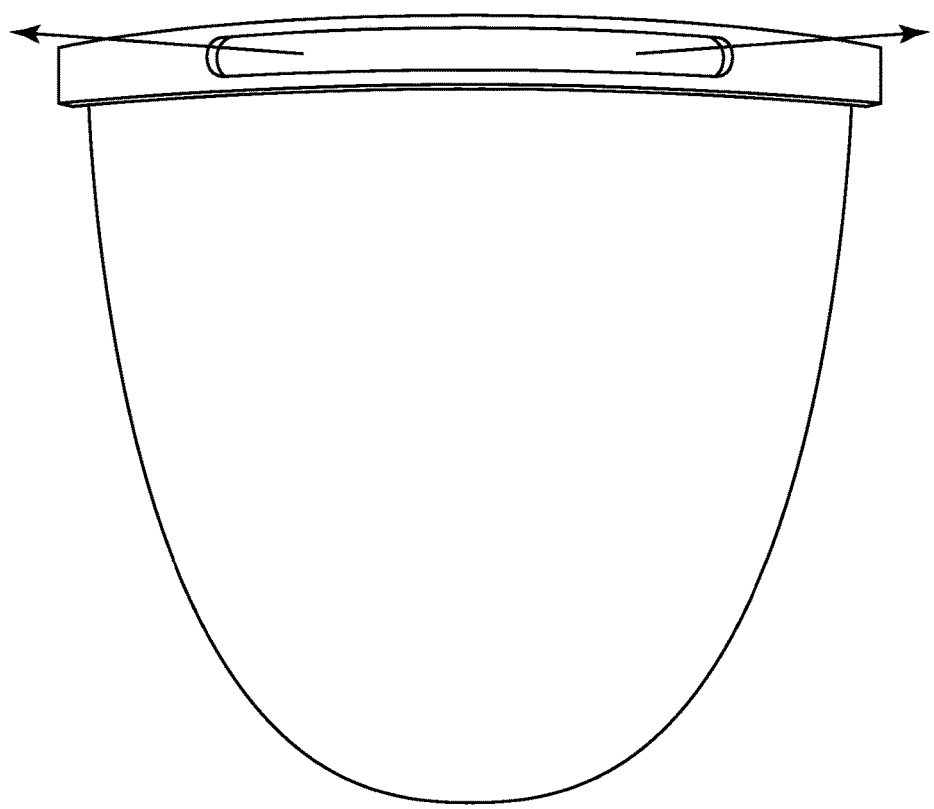
FIG. 28 shows a photograph of an exemplary embodiment of an illumination article of the present disclosure.

This scaling gives the simulated illuminance distribution shown in FIGS. 26A and B. The extractor shapes are designed to over-collimate the emitted light in the horizontal plane to compensate for the face shield curvature. The simulated intensity distribution is given in FIG. 27A (and is further illustrated by the accompanying FIG. 27B which illustrates Intensity versus solely Vertical Angle, and FIG. 27C which illustrates Intensity versus solely Horizontal Angle). The backside of the bezel was coated with a reflective surface of ESR. Two NICHIA NSW006T LEDs were mounted inside the housing on each end as light sources. The LED controller for this application was essentially the same as that described for the Safety Eyeglasses above. While two additional LEDs were used here, and the level of current is different, a single resistor change was all that was needed to utilize the circuit design shown in FIG. 23 in the application. FIG. 28 is a photo of the prototype light guide when lit.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims.

What is claimed is:

1. An illumination article comprising:
   a wearable device configured to wear on the head of a wearer;
   a lightguide disposed on the wearable device, wherein the lightguide is elongated and has a first end and a second end opposite the first end; and
   a first light source positioned at the first end, configured to emit light into the lightguide;
   wherein the lightguide further comprises:
      a light emitting surface extending generally in an x-direction between the first and second ends; and
      a light reflecting surface positioned opposite to the light emitting surface;
   wherein the light reflecting surface comprises a plurality of light extractors configured to direct light in a y-direction perpendicular to the x-direction, and
   wherein the light emitting surface is configured to direct light away from the wearer and quasi-collimate the light in a direction substantially parallel to an xy-plane.

2. The illumination article of claim 1, further comprising a second light source positioned at the second end, for emitting light into the lightguide.

3. The illumination article of claim 1, wherein at least some of the light extractors in the plurality of light extractors each include an extractor light reflecting surface, and the extractor light reflecting surface in at least some of the light extractors are curved.

4. The illumination article of claim 3, wherein the extractor light reflecting surface in at least some of the light extractors is convex.

5. The illumination article of claim 3, wherein the extractor light reflecting surface in at least some of the light extractors is concave.

6. The illumination article of claim 1, wherein at least a portion of the light emitting surface has a curved yz-profile.

7. The illumination article of claim 1, wherein the light emitting surface comprises facets.

8. The illumination article of claim 1, wherein at last some of the light extractors are wedge-shaped.

9. The illumination article of claim 8, wherein the light extractors comprise wedge-shaped extractors with negative cylindrical sag.

10. The illumination article of claim 8, wherein the light extractors comprise wedge-shaped extractors with positive cylindrical sag.

11. The illumination article of claim 1, wherein at least some of the light extractors in the plurality of light extractors are configured to convert a plurality of light rays generated by the first light source into a quasi-collimated light beam.

12. The illumination article of claim 11, wherein the quasi-collimated light beam is substantially within a 20-dgree deviation from the y-direction when emitted from the light emitting surface.

\* \* \* \* \*